United States Patent
Matsuki et al.

(10) Patent No.: US 7,744,095 B2
(45) Date of Patent: Jun. 29, 2010

(54) CYLINDER HEAD GASKET

(75) Inventors: Katsunori Matsuki, Okayama (JP);
Masashi Himesaki, Shizuoka (JP);
Shigeo Ogaki, Toyota (JP); Seiji Omura, Toyota (JP); Akira Yasuki, Toyota (JP)

(73) Assignees: Uchiyama Manufacturing Corp., Enami, Okayama-shi, Okayama (JP); U-Sun Gasket Corporation, Oyamachoisshiki, Sunto-gun, Shizuoka (JP); Toyota Jidosha Kabushiki Kaisha, Toyota-cho, Toyota-shi, Aichi (JP)

( * ) Notice: Subject to any disclaimer, the term of this patent is extended or adjusted under 35 U.S.C. 154(b) by 0 days.

(21) Appl. No.: 10/942,818

(22) Filed: Sep. 17, 2004

(65) Prior Publication Data

US 2005/0127615 A1    Jun. 16, 2005

(30) Foreign Application Priority Data

Sep. 17, 2003    (JP)    ............................. 2003-325055
Oct. 15, 2003    (JP)    ............................. 2003-354934
Dec. 1, 2003    (JP)    ............................. 2003-401426

(51) Int. Cl.
*F16J 15/08* (2006.01)
*F02F 11/00* (2006.01)
(52) U.S. Cl. .................. 277/596; 277/650; 277/654
(58) Field of Classification Search .............. 277/592, 277/596, 606, 608, 627, 628, 650, 654
See application file for complete search history.

(56) References Cited

U.S. PATENT DOCUMENTS

| | | | |
|---|---|---|---|
| 3,930,656 A | 1/1976 | Jelinek | |
| 4,247,510 A | 1/1981 | Desverchere | |
| 4,462,615 A * | 7/1984 | Ulmer et al. | ................. 277/592 |
| 4,535,999 A * | 8/1985 | Locacius | ..................... 277/596 |
| 4,635,949 A | 1/1987 | Lucas | |
| 4,962,939 A * | 10/1990 | Lonne et al. | ................. 277/601 |
| 5,374,069 A * | 12/1994 | Pecina | ......................... 277/592 |
| 5,390,939 A | 2/1995 | Terauchi | |
| 5,690,343 A | 11/1997 | Takada | |
| 6,575,473 B2 | 6/2003 | Sugimoto et al. | |
| 2004/0096730 A1 * | 5/2004 | Kuroki et al. | ................. 429/44 |

FOREIGN PATENT DOCUMENTS

| | | |
|---|---|---|
| CN | 1145980 A | 3/1997 |
| DE | DT 27 14 710 A1 | 10/1977 |
| DE | 3428682 A1 | 2/1985 |
| EP | 0 041 906 A1 | 12/1981 |
| EP | 0 084 498 A2 | 7/1983 |

(Continued)

*Primary Examiner*—Vishal Patel
(74) *Attorney, Agent, or Firm*—Bacon & Thoms, PLLC

(57) ABSTRACT

A cylinder head gasket for sealing between a cylinder block and a cylinder head, composed of a composite base plate, the composite base plate comprising a core material plate and a compound layer formed on the front and back surfaces of the core material plate, the compound layer being formed by coating compound materials which contain a rubber and a fiber material. The cylinder head gasket is comprised of an annular groove which is formed by pressing the corresponding region around the cylinder bore of the compound layer, and a bead projecting from the surface of the compound layer which is formed by inserting the rubber material into the annular groove.

2 Claims, 25 Drawing Sheets

FOREIGN PATENT DOCUMENTS

| | | |
|---|---|---|
| EP | 0 147 764 A1 | 7/1985 |
| JP | 1985-92746 U1 | 6/1985 |
| JP | U-62-77366 | 5/1987 |
| JP | A-63-096359 | 4/1988 |
| JP | B-6-84785 | 10/1994 |
| JP | A-2000-055206 | 2/2000 |
| JP | 2001-322141 | 11/2001 |
| JP | 2003-354934 | 10/2003 |
| JP | 2003-325055 | 11/2003 |

* cited by examiner

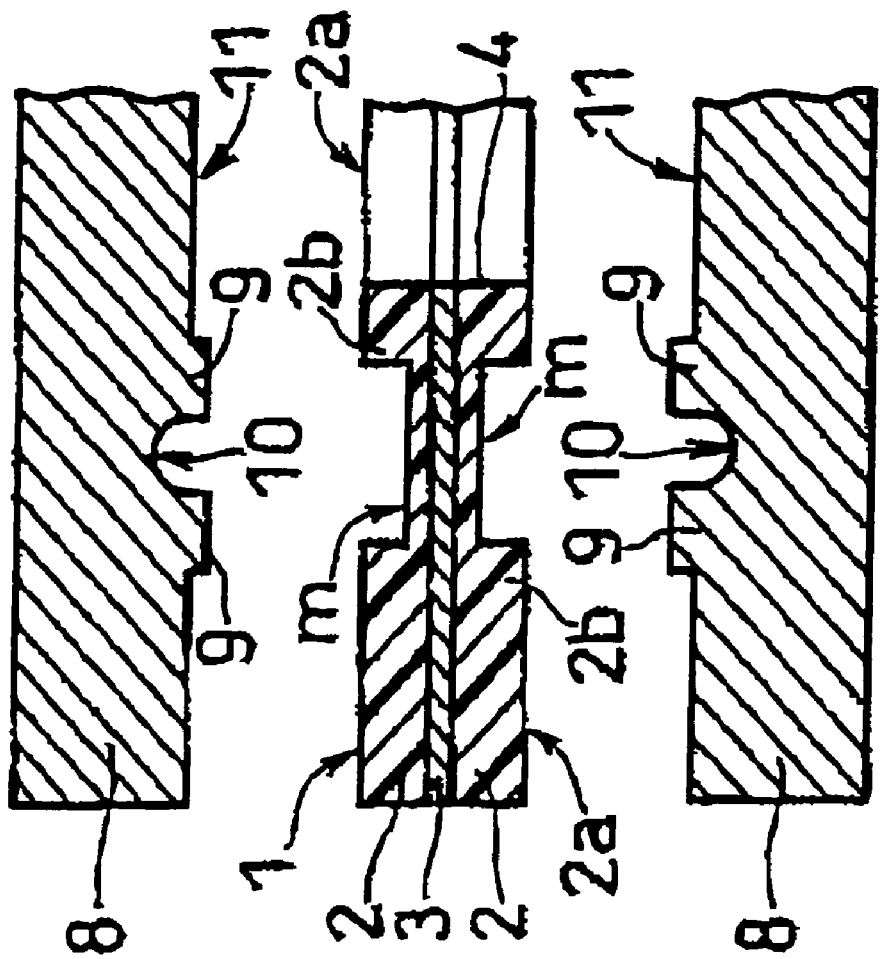

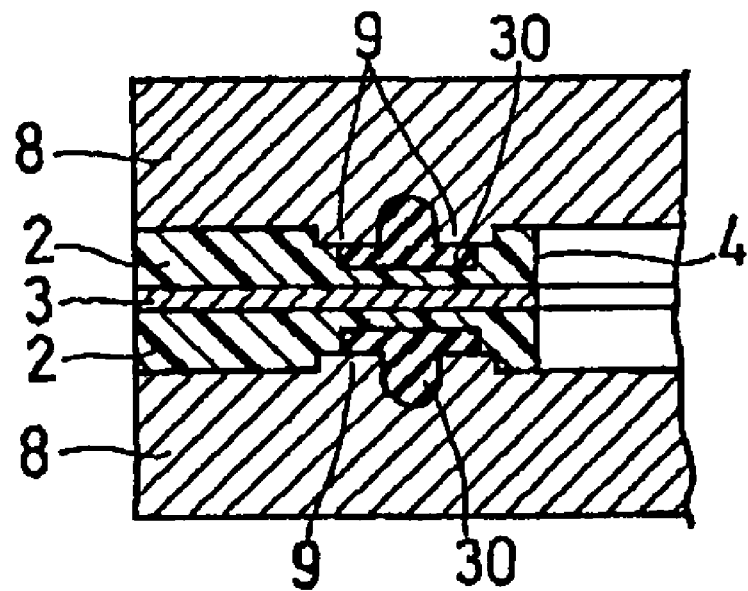

CYLINDER HEAD GASKET

FIELD OF THE INVENTION

The present invention relates to a cylinder head gasket, more specifically to a cylinder head gasket for sealing between a cylinder block and a cylinder head, composed of a composite base plate and a compound layer formed on the front and back surfaces of a core material plate, which is formed by coating compound materials containing rubber mixed with fiber material.

PRIOR ART

Various cylinder head gaskets of this type have been known to the public, for example, such a gasket in which a compound layer which is made of a basic fiber comprised of a compressible inorganic fiber excluding asbestos, a rubber material and an inorganic filler which is coated on the surface of the core material plate has been proposed and disclosed in JP-B-06-084785 and JP-A-63-096359. This type of gasket has such advantages that its torque down is small when the gasket is screwed between the cylinder block and the cylinder head compared with gaskets simply formed by coating a rubber material on a core material plate, and the coating layer is hardly peeled off the core material plate. Moreover, its thermal resistance is high.

It is effective to provide a gasket with a bead structure partially projecting around the corresponding region such as a cylinder bore in order to maintain a superior air tight performance. Such a cylinder head gasket has been also disclosed in JP-U-62-077366 and JP-A-2000-0055206.

Moreover, such cylinder head gaskets having a core metal plate and a compound layer coating it, as disclosed in JP-B-06-084785 and JP-A-63-096359 as above mentioned, and cylinder gaskets which derive from the view of combining rubber coated cylinder head gaskets and the technology as taught in JP-U-62-077366 and JP-A-2000-0055206 have also been proposed. That is, cylinder head gaskets with the advantages of the former and latter have been considered by producing a rubber coated metal gasket with a bead on its compound layer.

However, it is very difficult or practically impossible to form both of a compound layer and a bead simultaneously in a body as shown in the latter prior art, because such a compound material containing fiber material and rubber is inferior to the simple rubber material at the point of fluidity. Therefore, as shown in FIG. 23, a rubber coat metal gasket with a bead is usually produced in such a manner that after coating a compound layer 2 on the front and back surfaces of the core material plate 3 and forming a gasket 1, compound layers 2, 2 are bent convexly together with the core material plate 3 in order to form a bead 6.

According to the manner described above, there is a restriction defect to the size such that some kinds of bead with small width like a narrow convex bead cannot be produced because the core material plate itself is required to be bent. Further there is a utilization limit such that a gasket to be installed with a small size engine, where the screwing force between the cylinder block and the cylinder head is small, cannot be provided because the reaction force from the bent core material plate is strong. For that reason, there is a room for improvement.

As disclosed in JP-U-62-0077366 in which a bead is formed by bending the core material plate, because there is a restriction in the size or the shape of a bead such that a bead with a narrow convex section or a narrow bead cannot be produced and further there is a utilization limit such that a gasket to be installed with a small size engine of which the screwing force of the cylinder block and the cylinder head is weak cannot be provided because the reaction force from the bent core material plate is strong, it has poor usability.

As disclosed in JP-A-63-096359, a bead may be integrally formed with a compound layer made of a compound material containing a fiber material and a rubber. However, the bead is formed to be projected by compressing the other parts than the bead into the thickness direction with a molding die, so that the material density of that bead becomes low. Accordingly, supposing that the material strength of bead becomes smaller than the other parts there around and the bead is originally formed with a compound material with compressibility, if such a "weakening" bead is applied to the cylinder head gasket under severe requirement, the sealing ability of the gasket will not be improved.

As a countermeasure, the projecting amount of bead may be made large, however, in such a case, the bead fallen down a chunk causes a gap when the gasket is screwed between the cylinder block and the cylinder head. The sealing ability of the gasket is deteriorated, so that there is a room for further improvement of the construction of bead.

The present invention has been proposed in order to solve the above-mentioned problems. Therefore, it is a primary object of the present invention to provide a high-performance cylinder head gasket having a bead that does not have the above-mentioned disadvantages despite it employs a composite base plate such as a core metal plate coated with a compound material on its both surfaces and contributes the improvement of sealing ability on the compound material containing a fiber material and a rubber.

SUMMARY OF THE INVENTION

Accordingly, it is an object of the present invention to provide a cylinder head gasket for sealing between a cylinder block and a cylinder head, composed of a composite base plate, the composite base plate comprising a core material plate and a compound layer formed on the front and back surfaces of the core material plate, the compound layer being formed by coating compound materials which contain rubber and fiber material, the cylinder head gasket comprising an annular groove which is formed by pressing the corresponding region around a cylinder bore of the compound layer, and a bead projecting from the surface of the compound layer which is formed by inserting a rubber material into the annular groove.

According to such a gasket, the annular groove has a pair of concave shoulders along its both sides. Such concave shoulders may be formed by pressing the corresponding region of the annular groove with a press mold for forming the groove when the annular groove is formed by pressing the compound layer with the press die. For this purpose, the press die has a shape for forming the annular groove with the concave shoulders when it is pressed down on the compound layer.

Besides, the concave shoulders are formed by pressing the corresponding region of the annular groove with a molding die before the bead is formed by inserting the rubber material into the annular groove in an injection molding process. For this purpose, the molding die has a shape for forming the concave shoulders when it is pressed down on the annular groove.

It is another object of the present invention is to provide a cylinder head gasket for sealing between a cylinder block and a cylinder head, composed of a composite base plate, the composite base plate comprising a core material plate and a compound layer formed on the front and back surfaces of the core material plate, the compound layer being formed by coating compound materials which contain a rubber and a fiber material, the cylinder head gasket comprising an annular groove which is formed by removing the corresponding region around a cylinder bore of the compound layer, and a bead projecting from the surface of the compound layer which is formed by inserting a rubber material into the annular groove.

According to such a gasket, the annular groove is formed in a manner that a part of the core material plate is exposed out of the bottom portion in the annular groove.

Further also in this gasket, the annular groove may have a pair of concave shoulders along the both sides of the groove.

Still further according to the gasket, the concave shoulders are formed by pressing the corresponding region of the annular groove with a molding die before the bead is formed by inserting the rubber material into the annular groove in an injection molding process. For this purpose, the molding die has a shape for forming the concave shoulders when it is pressed down on the annular groove.

It is a still further object of the present invention is to provide a cylinder head gasket for sealing between a cylinder block and a cylinder head, composed of a composite base plate, the composite base plate comprising a core material plate and a compound layer formed on the front and back surfaces of the core material plate, the compound layer being formed by coating compound materials which contain a rubber and a fiber material, wherein an annular bead with a chevron section is formed around the peripheral region of a bore of the compound layer, the annular bead being formed by raising the corresponding region of the compound layer and having a top projecting from the surface of the compound layer, and wherein the both skirts of the annular bead are formed as two grooves in a manner that the both skirts subside the lower surface of the compound layer.

According to the gasket, the composite base plate has a compound layer on the front and back surfaces of the core material plate, the compound layer is formed by coating the compound materials and the annular bead is formed on the front and back surfaces of the composite layer. Or the density of compound layer at the annular bead is higher than that of other portions of the compound layer.

According to the gasket, the annular beads may be formed concentrically around the periphery of the cylinder bore of the cylinder head gasket.

According to the first aspect of the invention, the bead is made of a rubber material superior in fluidity in processing and the groove is formed by means of post processing such as compression of the compound layer, so that the design modification of groove in shape and size and so on is flexible and its production is more facilitated. Accordingly, a complexly shaped bead such as narrow one or one with many branches can be formed.

The bead can be formed in variable shapes and sizes and the rubber material inserted into the groove gets in touch with the bottom and both sides thereof three-dimensionally, so that the rubber material is not easily peeled off and has strong jointing force, thereby securing superior durability.

Further according to such gasket of the present invention that concave shoulders are formed at both edges of the groove, the concave shoulder serves as an escape hole for pushing and deforming the rubber material when the bead is excessively compressed.

Still further according to such gasket of the present invention that the concave shoulders and the groove are coincidentally formed by pressing the corresponding region with the molding die, its productivity is more facilitated.

Such concave shoulders can be also coincidentally formed at the formation process of the groove by using the molding die with a pressing part for concave shoulder. According to usage of such molding die, a special die and a forming process for the concave shoulder can be saved, thereby realizing cheaper manufacturing.

According to the second aspect of the present invention, it is not required to coincidentally and integrally form the compound layer and the bead, so that its productivity is facilitated. Further in this gasket, the bead is made of a rubber material that is excellent in fluidity when being processed, thereby enabling to be produced in an optional shape. Further the groove is formed by a post process of removing a part of compound layer, forming of the compound layer itself can be facilitated and the design modification in shape and size and so on can be also facilitated. Accordingly, a bead with complex shape such as a narrow bead or a bead with many branches may be easily manufactured.

Since the rubber material having been inserted into the groove gets in touch with the bottom and both sides thereof three-dimensionally, so that the rubber material is not easily peeled off and has a strong jointing force, thereby securing a superior durability like as the first aspect of the present invention.

Further, since the rubber material having been inserted into the groove comes into contact with the bottom and both sides of the groove three dimensionally, the rubber material is able to be directly integrated with the core material plate by means of adhesion or a vulcanization adhesion or other similar method, thereby improving the integration strength of the bead. Moreover, since the thickness of the rubber material at the bead portion can be made large, the durability is also improved by reducing the increase of stress when being screwed between the cylinder block and the cylinder head. Further, the sealing ability can be improved by enlarging the projection ratio of the bead.

Further according to such gasket of the present invention that concave shoulders are formed at both edges of the groove, the concave shoulder serves as an escape hole for pushing and deforming the rubber material when the bead is excessively compressed.

Still further according to such gasket that the concave shoulder is made by pressing the both sides of the groove with the molding die, the molding die and the compound layer, especially both sides of the groove, can be strongly compressed, when the rubber material is inserted into the groove with the both sides of the groove strongly pressed, the rubber material is prevented from running between both, namely so called rubber winding phenomena can be prevented, thereby enabling forming of the bead in good condition.

According to the third aspect of the present invention, the annular bead with a chevron section is formed at the corresponding region around the cylinder bore of the compound layer, so that the setting pressure around the cylinder bore becomes high under the standard fastening torque and the sealing ability around the cylinder bore, which is strictly required, is improved.

In addition, both skirts of the annular bead are formed as grooves depressed deeper than the surface of the compound layer, therefore, the groove serves as an escape hole for a protruded bead when the cylinder head gasket is excessively compressed. As the result, the sealing ability is not deteriorated because of the protruded bead, thereby ensuring a high sealing ability.

In view of micro observation, the distance between the cylinder block and the cylinder head around the cylinder bore is larger than the other part because of the annular bead and the shape of the combustion chamber becomes bulged, thereby obtaining the effect of reducing the displacement of the cylinder head caused by the explosion in the combustion chamber, which is generally called as a "shim effect".

Further according to the third aspect of the invention, the compound material is coated on the front and back surfaces of the core material plate to form the composite base plate, thereby improving the sealing ability even when the gasket is excessively pressed and the "shim effect" as mentioned above is also enhanced.

Still further in such a gasket, the elastic action is applied to the annular bead, the compression displacement of the annular bead becomes gentle when the cylinder head gasket is fastened, and the annular bead has such restoring force that the annular bead returns to its original height when being released. Therefore, if the cylinder head gasket is used repeatedly, the sealing effect of the annular bead keeps a superior durability without deterioration.

Still further according to the third aspect of the present invention, the setting pressure around the cylinder bore of the cylinder head gasket can be heightened without changing the fastening torque of the cylinder block and the cylinder head, thereby realizing a more preferable sealing ability.

BRIEF DESCRIPTION OF THE DRAWINGS

FIG. 3a is a sectional view just before a groove-processing with a press mold, FIG. 3b is a sectional view showing how to form a groove by pressing with the upper and lower press molds, and FIG. 3c is a partial side view of a cylinder head gasket after the press molds are released.

FIG. 4 shows an injection process according to the first aspect of the present invention, FIG. 4a shows a sectional view just before molding dies are set, FIG. 4b is a sectional view showing how injection molding is executed.

FIG. 13a is a sectional view just before injection molding, FIG. 13b is a sectional view when molding dies are set, and FIG. 13c shows how a rubber material is injected into a groove.

DETAILED DESCRIPTION OF THE INVENTION

Now the first aspect of the present invention is explained.

Preferred Embodiment 1

Figure 1:
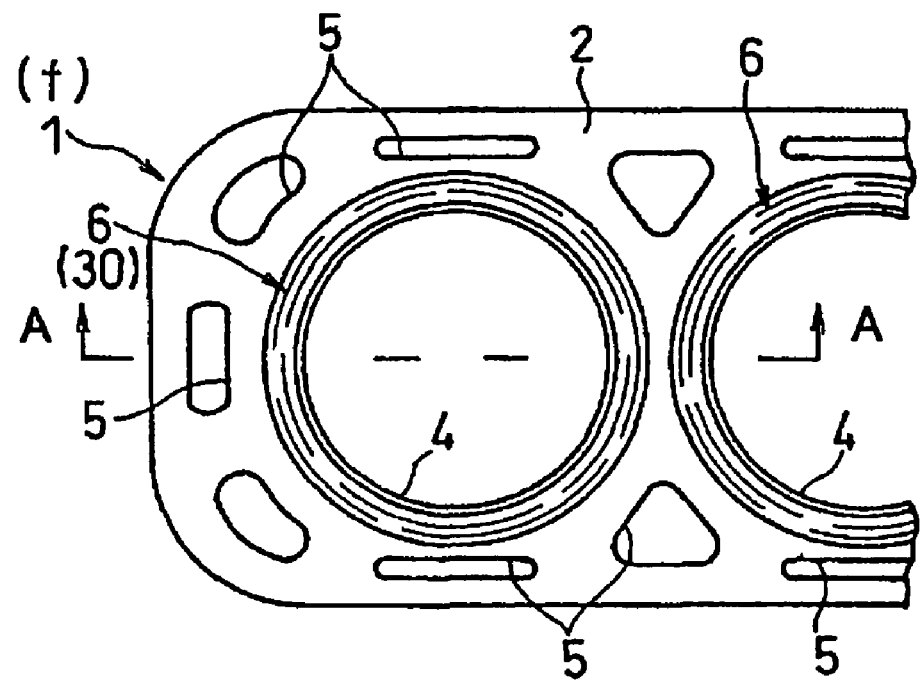
FIG. 1 is a partial plan view showing one example of a cylinder head gasket of the present invention (applied to the first, second and third aspects of the invention).
Figure 2:
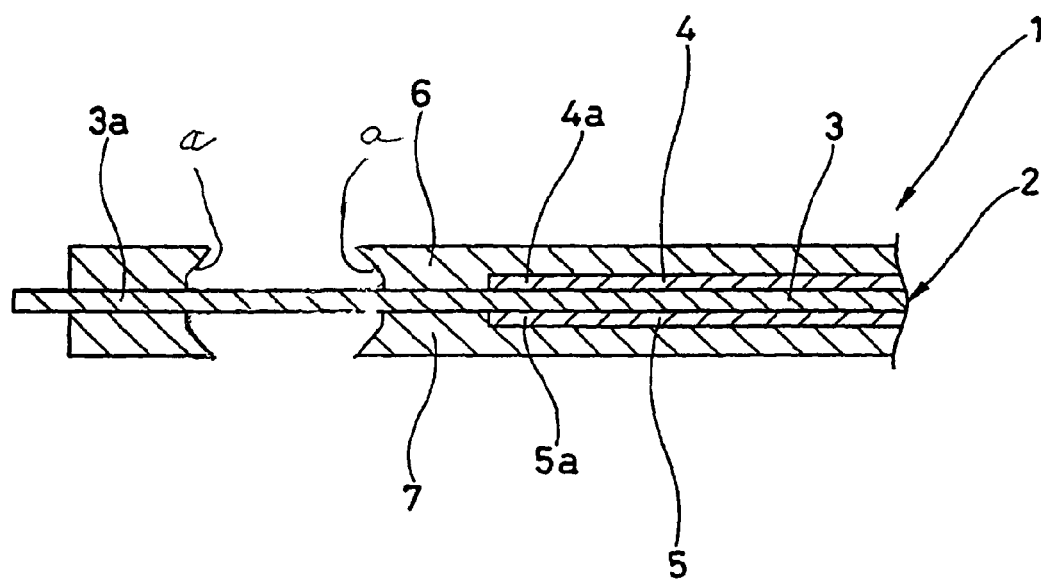
FIG. 2 is a section taken along line A-A of FIG. 1.

FIG. 1 and FIG. 2 show a cylinder head gasket 1 intervened between a cylinder block and a cylinder head of an engine. The cylinder head gasket 1 is a double-sided rubber coat metal gasket made of a composite base plate f comprising a core material plate 3 like SPCC (cold rolled steel sheet) and a compound layer 2 which is formed such that a fiber material as a reinforcing material is mixed with a rubber to be coated on the upper and lower surfaces of the core material plate 3.

The fiber material includes an inorganic fiber like glass fiber, ceramic fiber, asbestos, mineral wool, soluble quartz fiber, chemical treating high silica fiber, fused aluminum silicate fiber, alumina continuous fiber, stabilized zirconia fiber, boron nitride fiber, titanic acid alkali fiber, whisker, carbon fiber, metal fiber, boron fiber and so on. The fiber material also includes an organic fiber like aromatic polyamide fiber, polyamide fiber, polyolefin fiber, polyacrylonitrile fiber, polyvinyl alcohol fiber, polyvinyl ester fiber, polyvinyl chloride fiber, polyurea fiber, polyurethane fiber, polyfluorocarbon fiber, phenol fiber, cellulosic fibers and so on. Rolled plates and sheets of steel such as the above-mentioned SPPC, SPHC and the like, an aluminum plate, a stainless steel plate, and so on may be used as the core material plate 3.

Rubber (rubber material) is for example, nitrile rubber (NBR), styrene butadiene rubber (SBR), isoprene rubber (IR), chloroprene rubber (CR), butadiene rubber (BR), butyl rubber (IIR), ethylene propylene rubber (EPM), fluororubber (FPM), silicone rubber (Si), chlorosulfonated polyethylene (CSM), ethylene vinyl acetate rubber (EVA), polyethylene chloride (CPE), butyl chloride rubber (CIR), epichlorohydrin rubber (ECO), nitrilo isoprene rubber (NIR), natural rubber (NR), and the like. Oil extension rubber formed such that naphthene process oil is added into these rubber materials like SBR may be used.

Now, the production method of the cylinder head gasket 1 is briefly explained.

Figure 6:
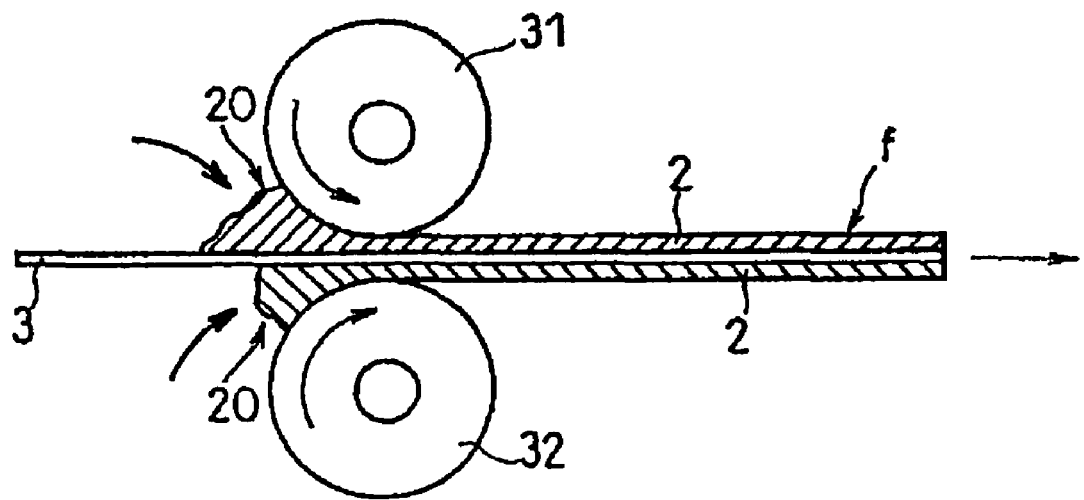
FIG. 6 shows the principle of the production method of a composite base material used for a cylinder head gasket.

The composite base plate f for the cylinder head gasket 1 is formed by a rolling method with an upper roll 31 and a lower roll 32 as shown in FIG. 6. Each roll 31 and 32 is driven to be rotated while the core material plate 3 is provided between the rolls 31 and 32 and a compound material 20 in fluid state is fed between each roll 31 and 32 and the core material plate 3 respectively. Thus, the compound material 20 is coated on the both sides of the core material plate 3 at predetermined thickness and is rolled out of the downstream side of the rolling direction of the rolls 31 and 32 in the form of the composite base plate f having the compound layer 2.

Figure 7:
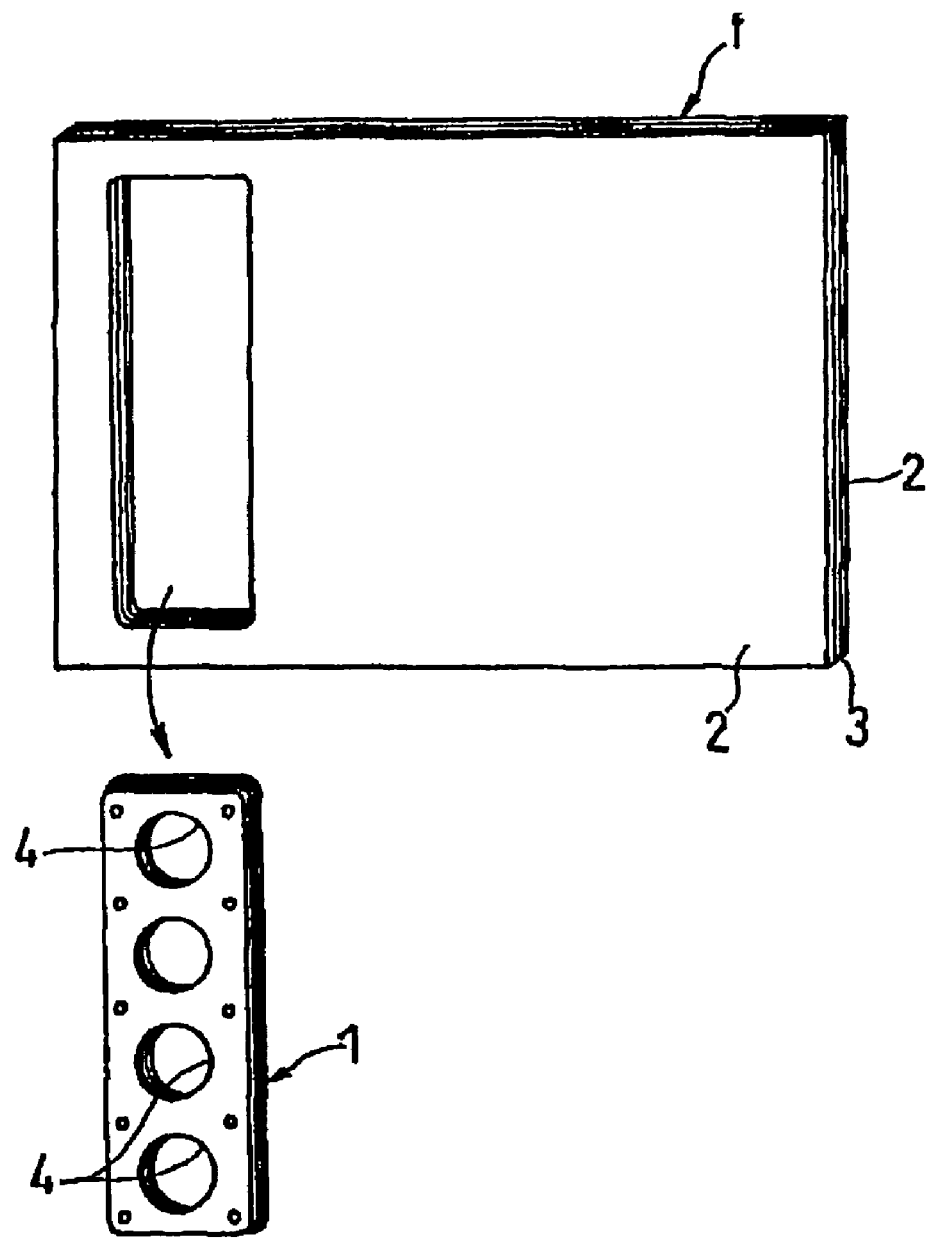
FIG. 7 is an operational view when a cylinder head gasket is punching out of a formed composite base material.

Thus formed composite base plate f is taken out to be extended like a flat plate and is formed into a predetermined shaped cylinder head gasket 1 by a punch press process and a press process for making bores as shown in FIG. 7.

Next, a bead structure is explained.

Figure 3:
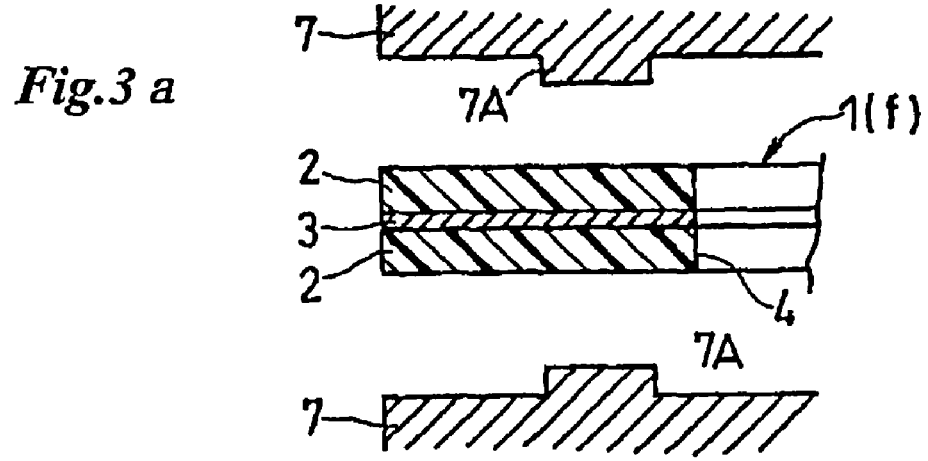
FIG. 3 shows a groove forming process according to the first aspect of the present invention.
Figure 3:
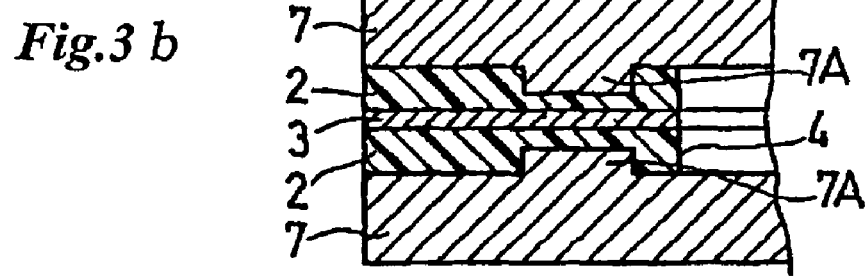
Figure 3:
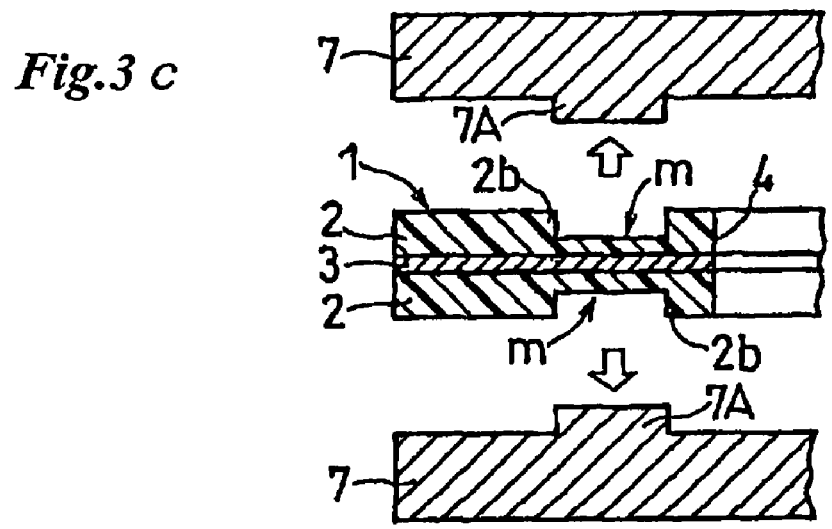

The bead structure 6 is formed by a grooving process and an injection process. In the grooving process as shown in FIG. 3a-FIG. 3c, the compound layer 2 corresponding to the region around the cylinder bore of the composite base plate f is compressed to form a groove m. While the compound layer 2 is plainly coated on both sides of the core material plate 3 respectively, the cylinder head gasket 1 is set between upper and lower press molds 7 as shown in FIG. 3a. Here are comprised projections 7A for forming grooves respectively by the upper and lower press molds 7.

As shown in FIG. 3b, the both press molds 7 are moved so as to be close each other to bite the projection 7A into the compound layer 2 respectively to be compressed. Then, the press molds 7, which are shaped symmetrical each other, are separated, the ring-like groove m with a predetermined depth is formed on the upper and lower compound layers 2 as shown in FIG. 3c.

Such a groove formed by compression utilizes the characteristic of the compound material that contains fiber material and rubber, namely the improved retention under compression. Because the compound material has a plastic deformation property by compression, if the groove is made by compressing the compound layer in the thickness direction by a molding die, the resultant groove can be kept after the molding die is separated.

Figure 4C:
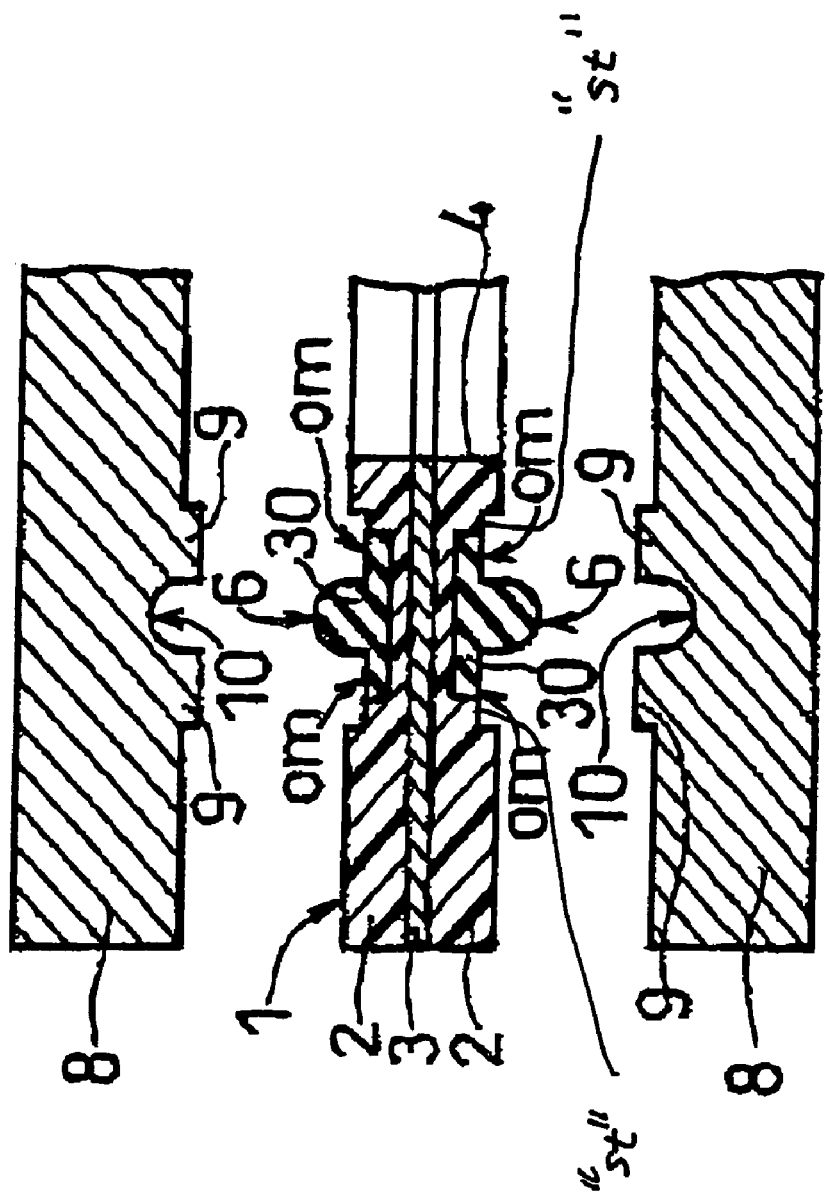
FIG. 4c is a partial side view of a cylinder head gasket after the molding dies are released.

In an injection process as shown in FIG. 4a-FIG. 4c, an unvulcanized rubber material is charged into the groove m by injection molding by means of upper and lower molds 8. As shown in FIG. 4a, the molds 8 are shaped symmetrical each other and the upper mold 8 is used for explanation. The upper mold 8 has a projection 9 at both sides and an annular recess 10 provided between both projection 9 corresponding to the groove m.

Each projection 9 thrusts out of a standard press surface 11 (downward in FIG. 4), its section is substantially rectangle and the projection 9 is formed so as to reach the side area 2b at both sides of the groove m of the compound layer 2. The recess 10 caved inside of the standard press surface 11 (upward in FIG. 4) has a circular top.

The bead structure 6 is formed as follows by injection process. As shown in FIG. 4a, the cylinder head gasket 1 formed with the groove m is prepared between the upper and lower molds 8 and 8. Then, the upper and lower molds 8 and 8 are approached each other such that the standard press surface 11 lightly touches the outer surface 2a of the compound layer 2 as shown in FIG. 4b. Simultaneously, each projection 9 is positioned at the groove m and it cuts into each side area 2b so as to compress both side areas 2b in up and down direction.

Unvulcanized rubber material 30 is injected to be charged into the cavity of the groove m surrounded with the upper and lower molds 8 and the compound layer 2. Then, the upper and lower molds 8 are separated and the cylinder head gasket 1 having the bead structure 6 is formed by the rubber material 30 charged into the recessed part 10 as shown in FIG. 4c. The rubber material 30 is injected while compressing the both side areas 2b of the groove m of the compound layer 2, so that it is preferable because the rubber material 30 does not run between the compound layer 2 and the mold 8 (namely rubber winding).

The bulk compressibility of each side area 2b is desirably over 30%, so that a new recess groove om, namely one example of concave shoulders, can be formed around the bead structure 6. Therefore, when the bead structure 6 is excessively compressed between the cylinder block and the cylinder head, such shoulder concave om will function as a refuge of the pushed rubber material 30. In this preferred embodiment, the concave shoulder om is formed by pressing the compound layer 2 at the side area 2b with the mold 8 when the rubber 30 is injected into the groove m to form the bead structure 6.

Figure 5:
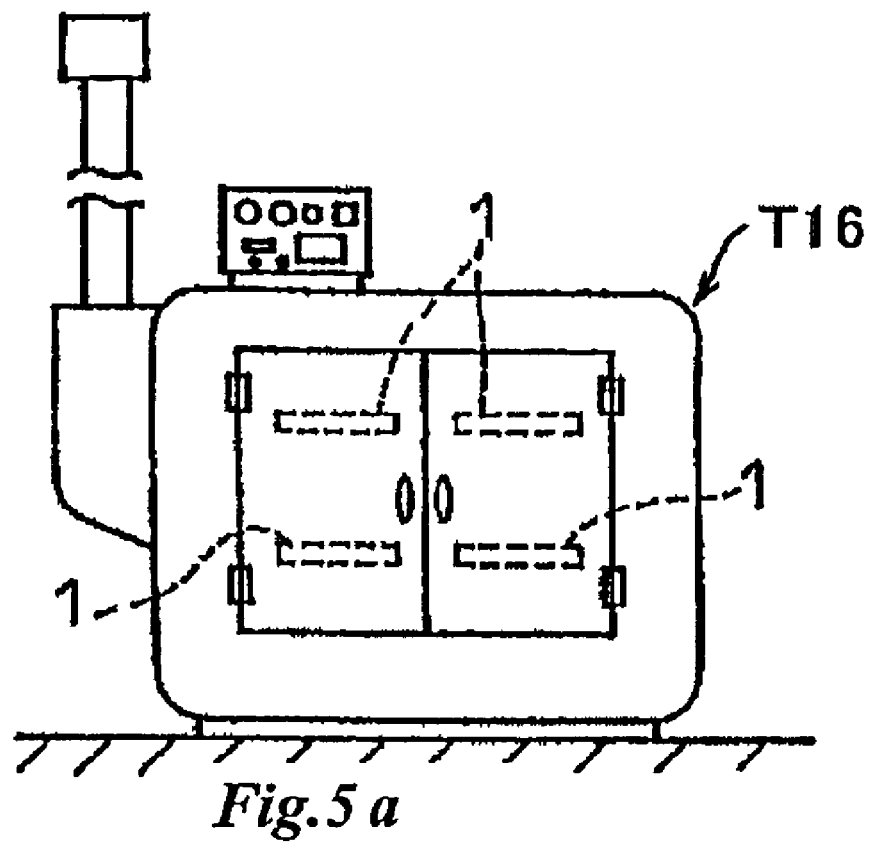
FIG. 5a shows vulcanization process and FIG. 5b shows an entire perspective view of a cylinder head gasket formed with a bead structure.
Figure 5:
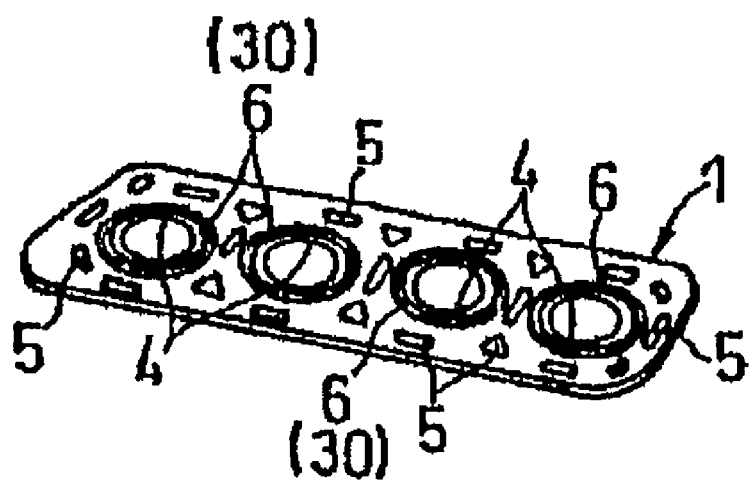

As shown in FIG. 5a, the cylinder head gasket 1 taken out of the mold is subjected to vulcanization process in a vulcanization tank T16 and the rubber material 30 and the compound layer 2 are compressed to stabilize the shape and the composition. The groove is thus formed by compressing the compound layer 2 and the rubber material 30 is charged into thus formed groove by injection, thereby obtaining the cylinder head gasket 1 with the bead structure 6 (refer to FIG. 5b and FIG. 1).

When the bottom of the groove m is applied with adhesive, the rubber material 30 is charged in the groove m, so that the hardening of the adhesive is accelerated by the heat of rubber material 30, thereby achieving heat adhesion (it may called as baking adhesion) such that the compound layer 2 and the rubber material 30 are strongly and integrally glued. Depending on the kinds of adhesive, vulcanization adhesion is possible in which the core material plate 3 and the rubber material 30 are strongly and integrally glued by the heat of vulcanization process shown in FIG. 5b.

Preferred Embodiment 2

Figure 8:
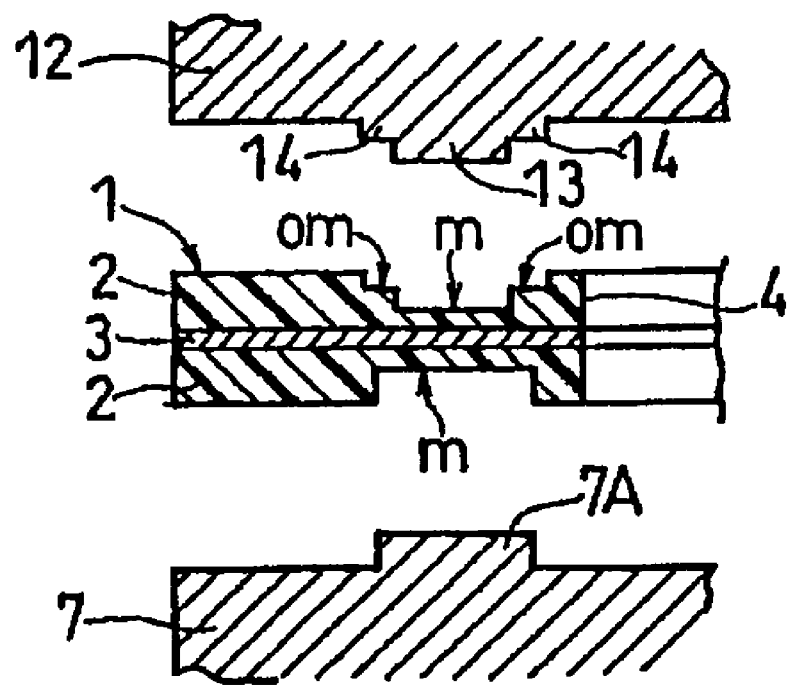
FIG. 8 is a sectional view showing other groove forming method according to the first aspect of the present invention.
Figure 9:
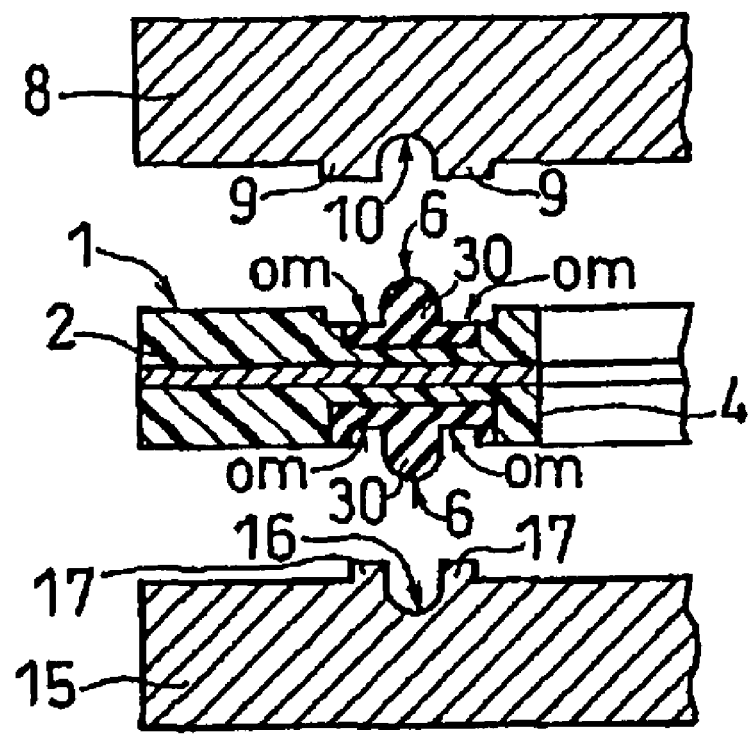
FIG. 9 is a sectional view showing other injection procedure according to the first aspect of the present invention.

The concave shoulder om may be formed by pressing the side area 2b of the compound layer 2 with a press mold 12 for groove when the groove m is formed by compressing the compound layer 2. That is, as shown in the cylinder head gasket 1 in FIG. 8 and FIG. 9, small projections 14 are provided for forming the concave shoulders at both sides of a projection 13 for forming groove of the upper press mold 12, so that the concave shoulder om is simultaneously formed when the groove m is formed (see FIG. 8). The rubber material 30 is injected into the groove m and is molded with the mold 8, then the bead structure 6 having the concave shoulders (recess groove) om at both sides are formed (see FIG. 9).

Preferred Embodiment 3

The cylinder head gasket 1 may be constructed such that the concave shoulder om is formed with the area of the rubber material 30 injected for forming the bead structure 6. The groove m is formed with the press mold 7 like the preferred embodiment of the present invention (see FIG. 8), however, a mold 15 for injection molding has a small projection 17 for forming the concave shoulder at both sides of a recess part 16 for forming the bead structure (see FIG. 9). Thus, the cylinder head gasket 1 having the concave shoulder (recess groove) om within the area of the rubber material 30 is formed by the mold 15.

Preferred Embodiment 4

Figure 10:
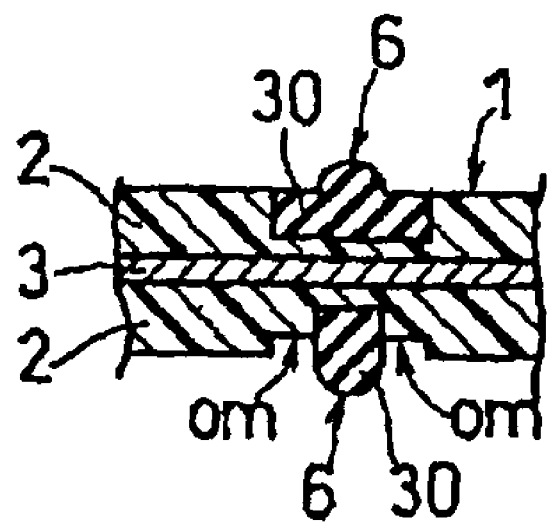
FIG. 10 is a partial section of a cylinder head gasket showing other bead structure according to the first aspect of the present invention.

The cylinder head gasket 1 may not have the concave shoulder om on any one of the rubber material 30 and the compound layer 2 at both sides of the bead structure 6 as shown in FIG. 10. Or the cylinder head gasket 1 may be constructed such that the concave shoulder om is formed on the side area of the groove of the compound layer 2 by compression and the width of the rubber material 30 is small corresponding to the width of the bead structure 6 as shown in FIG. 10.

As mentioned above, according to the first aspect of the present invention, the annular groove is formed by compressing the compound layer 2 corresponding to the region around the cylinder bore of a composite base plate, the rubber material is charged into thus formed groove, and the bead structure 6 is formed so as to project in the thickness direction from the outer surface of the compound layer 2.

Therefore, the cylinder head gasket 1 is formed such that the rubber material comprised of a single material that is not mixed with other material like fiber is charged into the groove of the compound layer 2 formed by the post processing and the bulged bead structure 6 is formed. The bead structure 6 made of the rubber material which is hardly peeled off, is easily deformed by compression and is effective for improving the sealing ability can be formed for the rubber coat metal gasket formed by coating a surface layer on the core material plate 3 while keeping the production efficiency, thereby providing a cylinder head gasket which meets the requirement of strict air tight performance and pressure withstanding performance.

According to such a gasket with the concave shoulder as mentioned above, if the cylinder head gasket, namely the bead structure 6, is excessively compressed in case of assembling by such fastening torque that it is more over than a standard value, the concave shoulder may serve as a an escape hole for the rubber material pushed by the deformation of such excessive compression.

The concave shoulder may be simultaneously formed with the press mold for forming groove, or may be formed by the compression of the mold for injection molding as mentioned above. In any one of these methods, an exclusive mold or an exclusive process is not required for forming the concave shoulder, so that the concave shoulder can be economically formed.

Next, the second aspect of the present invention is explained.

In the second aspect of the present invention, an annular groove is formed by removing a compound layer around a cylinder bore. The outside constructed appearance of a cylinder head gasket is the same as that of the first aspect of the present invention (see FIG. 1 and FIG. 11).

Preferred Embodiment 5

Figure 11:
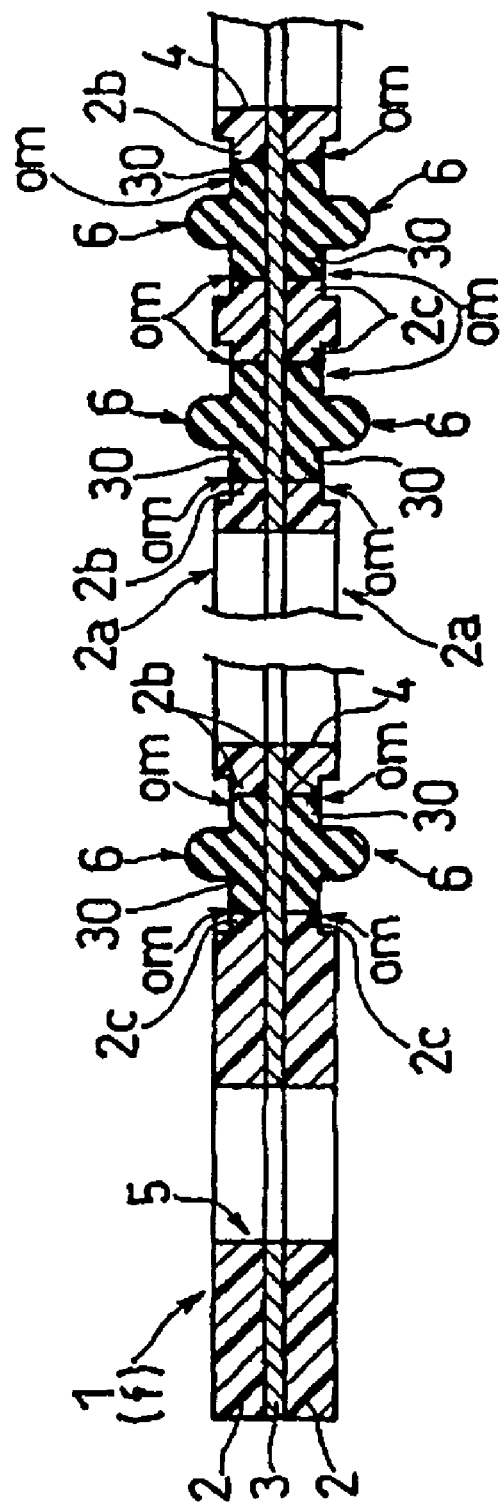
FIG. 11 is a section taken along line A-A of FIG. 1.
Figure 12:
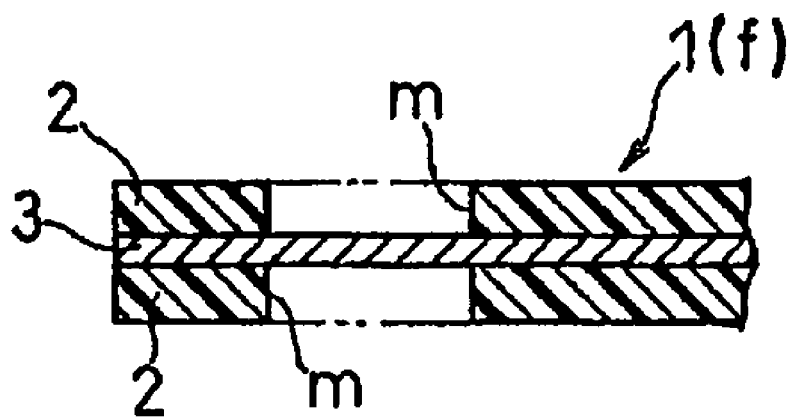
FIG. 12 shows a partial section of a cylinder head gasket in which a groove is formed on a compound layer according to the second aspect of the present invention.

A bead structure in the second aspect is also formed by a groove forming process and an injection process. In the groove forming process, the compound layer 2 corresponding to the region around the cylinder bore of a composite base plate is removed to form a groove m as shown in FIG. 11 and FIG. 12. While the compound layer 2 is coated in flat condition on both sides of a core material plate 3, the compound layer 2 is shaved into the core material plate 3 by means of a sandblast, thereby forming a ring groove m.

For removing the compound material 2 to form the groove m, a laser process or a mechanical peeling means like blast, chemical erosion or biological erosion may be available. Or the core material plate 3 is masked with a masking tape before the compound material is coated on the core material plate 3 and the compound layer 2 is removed by peeling the masking tape to form an annular groove after coating.

Figure 13:
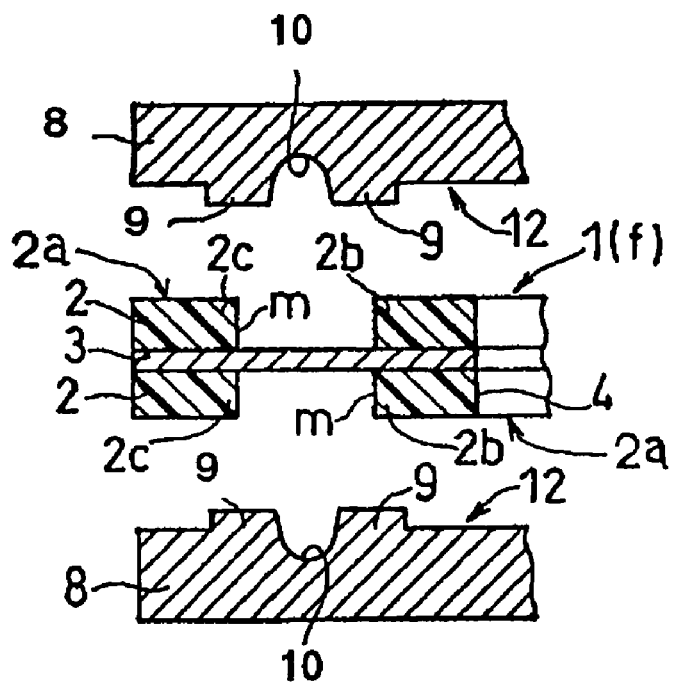
FIG. 13 shows a substantial part of a bead structure according to the second aspect of the present invention.
Figure 13:
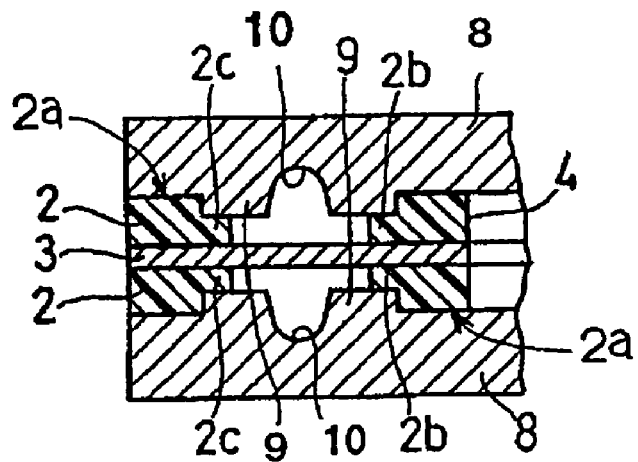
Figure 13:
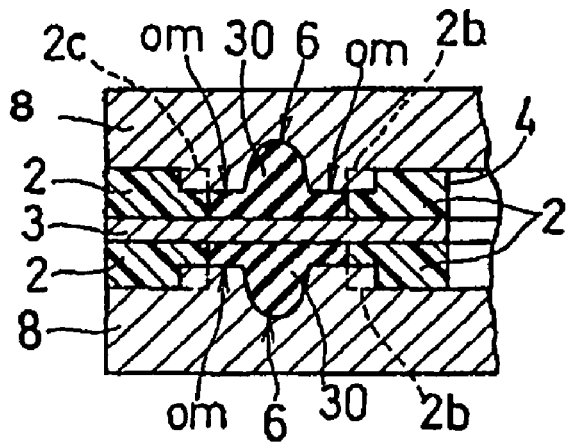

In an injection process, an unvulcanized rubber material is charged into the groove m by an injection molding by means of upper and lower molds 8 as shown in FIG. 13a. The upper and lower molds (press mold) 8 are shaped symmetrical each other as shown in FIG. 13a and the upper mold 7 is used for explanation. As shown in FIG. 13a, the upper mold 7 is provided with an annular inner projection 9, an annular outer projection 10, an annular recess part 11 between the projections 9 and 10 at the position corresponding to the groove m.

Each projection 9 thrusts out of a standard press surface 12 (in FIG. 13a), its section is substantially rectangle, and the projection is formed into the area reaching the inner side area 2b and the outer side area 2c of the groove m of the compound layer 2. The recess part 10 caved inwardly from the standard press surface 12 (in FIG. 13a) has such a shape that its top is circular and its skirt is gradually enlarged. The "inner and outer sides" of the area 2b and 2c are defined relative to the center of a large aperture 4 corresponding to the bore as a standard.

According to the injection process, the bead structure is formed as follows.

As shown in FIG. 13a, the cylinder head gasket 1 formed with the groove m, which has not been vulcanized, is prepared between the upper and lower molds 7. Then, the upper and lower molds 8 are approached each other such that the standard press surface 12 lightly touches the outer surface 2a of the compound layer 2 as shown in FIG. 13b. Simultaneously, the inner and the outer projections 9 and 10 are positioned at the groove m and they cut into each inner and outer side area 2b and 2c so as to compress the inner and outer side areas 2c and 2b in up and down direction.

Unvulcanized rubber material 30 is injected and charged into the cavity of the groove m surrounded with the upper and lower molds 8 and the core material plate 3 as shown in FIG. 13c. The bead structure 6 is formed of the rubber material 30 charged into the recess part 10. If the rubber material 30 is injected while compressing the both side areas 2b and 2c of the groove m of the compound layer 2, it is preferable because the injected rubber material 30 does not run between the compound layer 2 and the molds. 8 (namely rubber winding).

The bulk compressibility of each side area 2b and 2c is desirably over 30%, so that a new recess groove om (one example of the concave shoulder) can be formed around the bead structure 6. Therefore, when the bead structure 6 is excessively compressed between the cylinder block and the cylinder head, the concave shoulder om will serve as an escape hole for the pushed rubber material 30. The recess groove om may be formed at compressed part of the side areas 2b and 2c or the concave shoulder being the concave shoulder om may be formed as a result of setting the thickness of the part where the groove m is prepared thinner when the compound layer 2 is formed.

As shown in FIG. 14a, the upper and lower press molds 8 are separated and the cylinder head gasket 1 having the annular bead structure 6 on the upper and lower rubber materials 30 is taken out. The taken-out cylinder head gasket 1 is subjected to a vulcanization process in a vulcanization tank T16 and the rubber material 30 and the compound layer 2 are vulcanized to stabilize the shape and the composition as shown in FIG. 14b. Accordingly, the cylinder head gasket 1 in which the bead structure 6 made of rubber material is formed on the compound layer 2 is obtained by post processing (refer to FIG. 14c).

In this preferred embodiment, the annular groove m is formed by removing the compound layer 2 at the place corresponding to the region around the cylinder bore and the rubber material 30 is charged into the groove m to form the bead structure 6 projecting in the thickness direction out of the compound layer 2. While the inner side area 2b and the outer side area 2c of the groove m of the compound layer 2 are pressed with the molds 8 in the thickness direction, the rubber material 30 is charged into the groove m by an injection molding to form the bead structure 6 and then a vulcanization process is done as a finish procedure.

When the groove m is formed in a manner such that part of the core material plate 3 exposes at the bottom, the rubber material 30 directly contacts with the core material plate 3. Consequently if the exposed core material plate 3 is applied with an adhesive and the rubber material 30 is charged into the groove m, the hardening of the adhesive is accelerated by the heat of the rubber material 30, thereby achieving heat adhesion (it may be called as baking adhesion) such that the core material plate 3 and the rubber material 30 are strongly and integrally glued. Depending on the kinds of adhesive, vulcanization adhesion is also possible in which the core material plate 3 and the rubber material 30 are strongly and integrally glued by the heat of vulcanization process shown in FIG. 14b.

The compound layer 2 and the rubber material 30 are subject to vulcanization process after forming the bead structure 6 under unvulcanized condition, however the bead structure 6 may be formed under half-vulcanized condition. Or the groove m may be formed by subjecting the compound layer 2 into vulcanizing process and the rubber material 30 is charged in the groove m to form the bead structure 6.

Figure 14:
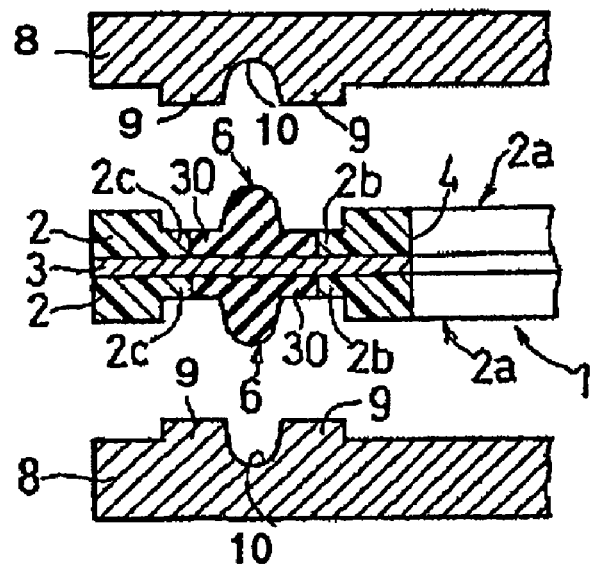
FIG. 14a is a sectional view when injection molding is finished according to the second aspect of the present invention.
FIG. 14b shows vulcanization process.
FIG. 14c is an entire perspective view of a cylinder head gasket with a bead structure.
Figure 14:
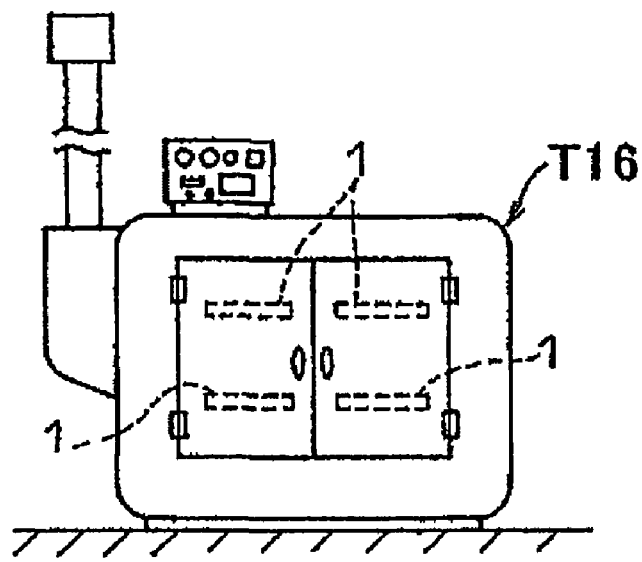
Figure 14:
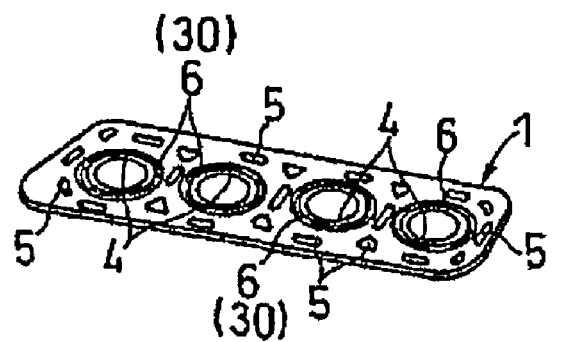
Figure 15:
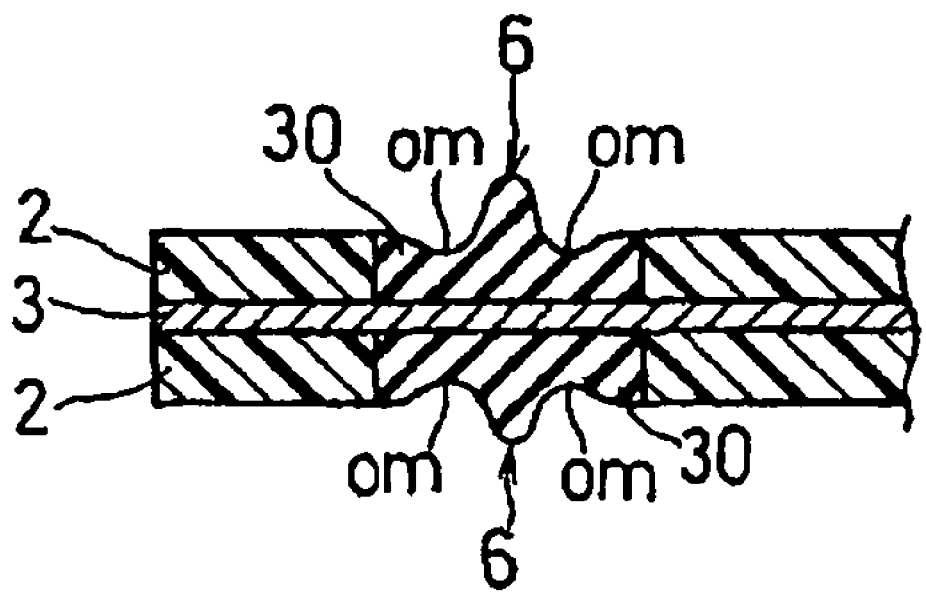
FIG. 15 is a partial section of a cylinder head gasket with other bead structure.

The shape of the rubber material 30 charged in the groove m may be formed such that the bead structure 6 and the recess grooves om at both sides are connected with a smooth curved line depending on the shape of the mold as shown in FIG. 14. The side areas 2b and 2c of the groove m of the compound layer 2 are set so as not to be compressed in the thickness direction, however, the concave shoulder may be formed by compression like the above-mentioned preferred embodiment (see FIG. 14a).

Preferred Embodiment 6

Figure 16:
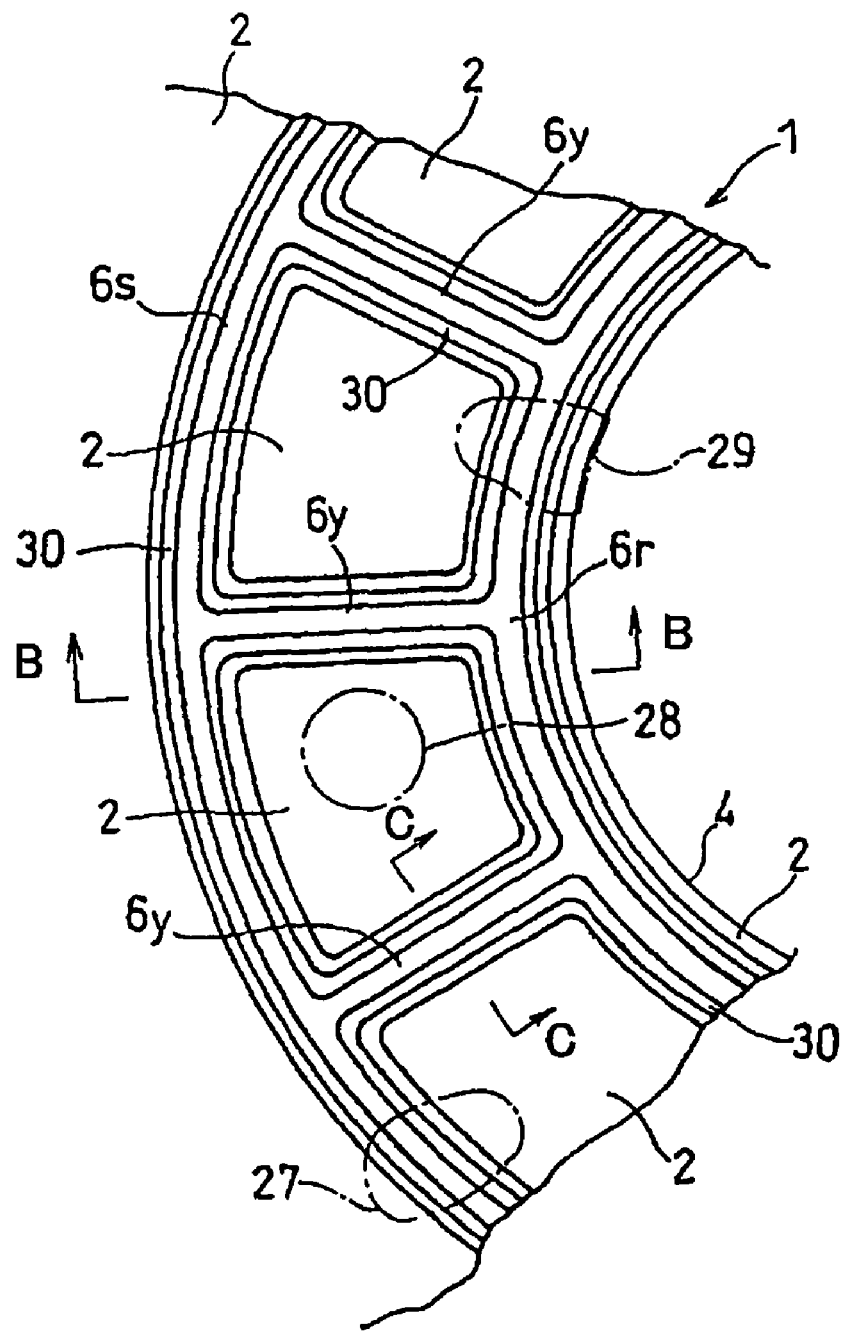
FIG. 16 shows the relation between a composite bead structure and pin holes.
Figure 17A:
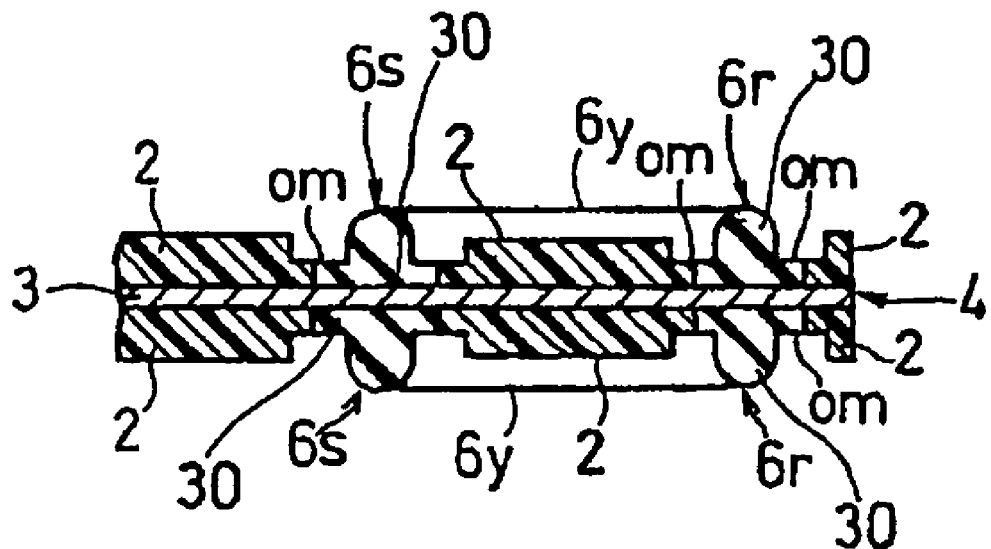
FIG. 17a shows the section taken along line B-B of FIG. 16
Figure 17B:
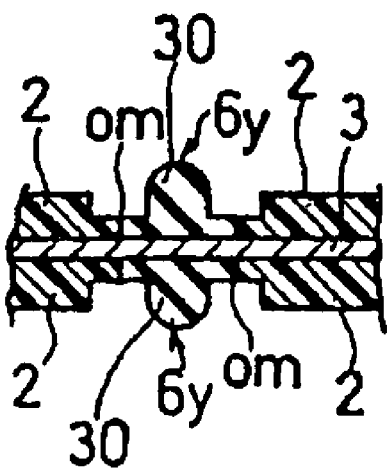
FIG. 17b shows a section taken along line C-C of FIG. 16.

Moreover, as shown in FIG. 16, FIG. 17a and FIG. 17b, two sets of an inner annular bead 6r and an outer annular bead 6s may be provided at an appropriate space from each other around the large aperture 4, and a side bead part 6y short-circuiting the inner and outer bead parts 6r and 6s may be formed in a radial pattern around the large aperture 4. In this case, the cylinder head gasket 1 is provided with a double annular complex bead structure around the large aperture 4. Such a complex bead structure can be also formed by an injection molding or other methods. FIG. 17a is a sectional view taken along line B-B of FIG. 16 and FIG. 17b is a sectional view taken along line C-C of FIG. 16.

When such a complex bead structure is formed with the double bead structures 6r and 6s and the side bead part 6y, it is effective as a countermeasure of a pin hole. The pin hole is a hollow part in the cylinder block and the cylinder head made of a cast metal including die-casting caused when air bubbles are mixed with a metal at the time of casting. If the pin hole is appeared on the contacting surface of the cylinder block or the like, it makes a cavity, thereby having an adverse consequence. The one-dotted broken lines indicated as the reference numerals 27-29 in FIG. 16 are the cavities caused by the pin hole appeared on the contacting surface of the cylinder block and the cylinder head when seen from the top (hereinafter, they are called as a pin hole).

There is a pin hole 29 covering the inside and outside of the inner bead part 6r as shown in FIG. 16, the inside and outside of the inner bead part 6r are communicated by the pin holes 29, so that the sealing function of the inner bead part 6r is damaged. However, they are blocked by the outer bead part 6s and the side bead part 6y so as not to be further communicated, thereby keeping a preferable sealing ability. Also, if there is a pin hole 27 covering the inside and outside of the outer bead part 6s, preferable sealing ability is kept by the inner bead part 6r and the side bead part 6y.

If there is a pin hole 28 at the place which is surrounded with a pair of neighboring side bead parts 6y and the inner and outer bead parts 6r and 6s, the part other than the surrounded part is not communicated, so that a preferable sealing ability can be kept by the cylinder head gasket 1. Accordingly, if a complex bead structure is formed with the outer and inner double bead structures 6r and 6s and plural side bead parts 6y, the adverse effect of the pin holes of the cylinder block and the cylinder head is prevented in almost all cases.

The cylinder head gasket 1 may be constructed such that the bottom of the groove m does not reach the core material plate 3 but exists within the thickness area of the compound layer 2, and consequently the bottom surface and the both side areas of the rubber material 30 charged into the groove m may contact with the compound layer 2 (not shown). The cylinder head gasket 1 may be also constructed such that the bead structure 6 is formed at the place corresponding to the region around a cooling bore 5 in which a cooling water or a cooling oil passes.

As mentioned above, according to the second aspect of the invention, the compound layer 2 corresponding to the region around the cylinder bore of the composite base plate 2 is removed to form the annular groove, the rubber material is charged into the groove m, and the bead structure 6 projecting in the thickness direction from the compound layer 2 is formed by charging the rubber material in the groove m.

According to the second aspect of the present invention, the cylinder head gasket 1 is obtained in which the compound layer 2 is easily formed, the bead structure 6 effective for keeping the air tight performance by a preferable sealing function is flexibly designed with many variations of shape and dimension, and further the compound layer 2 and the core material plate 3 are strongly integrated. If the core material plate 3 is exposed at the bottom of the groove m, the integrated strength of the rubber material 30 and the core material plate 3 is improved by the baking adhesion and the vulcanization adhesion.

If the concave shoulder om is formed at the side area of the groove m, it serves as a an escape hole for the pushed rubber material 30 when the bead structure 6 is excessively compressed, thereby keeping a preferable sealing ability. Further, if the concave shoulder om is formed by pressing the compound layer 2 of the side area of the groove m with a mold, it is advantageous that the rubber material 30 is prevented from running between the mold and the side area in case of injection molding.

Next, the third aspect of the present invention is explained.

Preferred Embodiment 7

Figure 18:
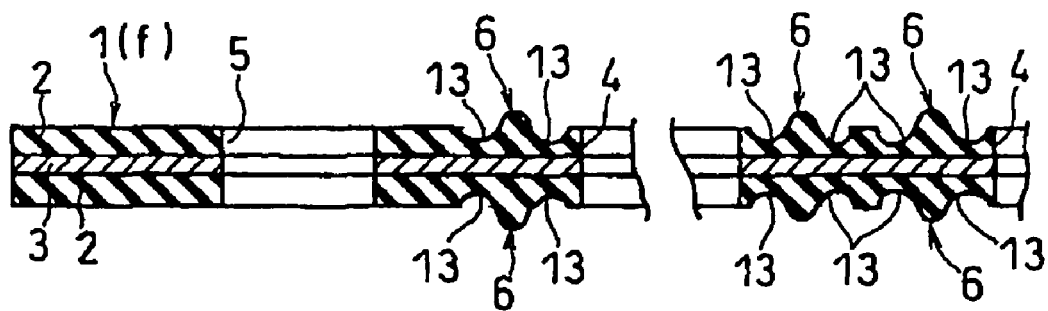
FIG. 18 is a diagrammatical section of a cylinder head gasket according to the third aspect of the present invention.

A cylinder head gasket 1 is provided with an annular bead structure 6 at the corresponding region around the cylinder bore as shown in FIG. 18, 19 (namely around a large aperture 4). The annular bead structure 6 has a chevron section, is formed with a bulged compound layer 2 and is formed with an annular groove 13, namely two-race groove, such that the top of the compound layer 2 projects from the surface of the compound layer 2 and both skirts 13 of the bead structure 6 subside lower than the surface of the compound layer 2. The top of the annular bead structure 6 is higher than the surface of the compound layer 2 with the distance d1, the skirt of the annular groove 13 is lower than the surface of the compound layer 2, and the thickness of the compound layer 2 at the bottom, namely the thickness d3 from the surface of a core material plate 3 to the bottom, is smaller than the thickness d2 of the compound layer 2.

Figure 19:
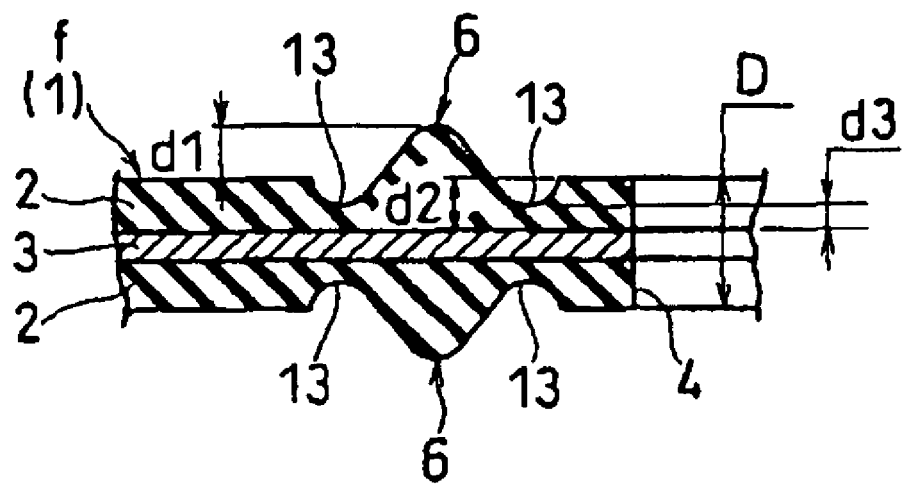
FIG. 19 is an enlarged sectional view of an annular bead structure according to the third aspect of the present invention.

In FIG. 19, if the thickness of the composite base plate f is D, the example dimension of each thickness is;

D: 0.5-1.5 mm
d1: 0.2-0.5 mm
d2: 0.2-0.5 mm
d3: 0.05-0.1 mm

It is preferable that d1 equals to d2. If d3 is smaller than 0.05 mm, the core material plate 3 might be bent because the stress is concentrated on d3 when the cylinder head gasket 1 is intervened between the cylinder block and the cylinder head to be integrated. Therefore, it is important to keep more than 0.05 mm.

With the cylinder head gasket 1 in which the annular bead structure 6 is formed by bulging the compound layer 2 like a mountain at the corresponding region around the cylinder bore, when the cylinder head gasket 1 is intervened between the cylinder block and the cylinder head to be integrated with a standard torque, the setting pressure around the cylinder bore becomes high, so that the sealing ability around the cylinder bore, which requires high performance, is improved.

In addition, there is a groove 13 caved into the surface of the compound layer 2 at both skirts of the annular bead structure 6, and the annular groove 13 is served as a refuge space when the cylinder head gasket 1 is excessively compressed and the annular bead structure 6 is excessively pushed to be protruded into sides. Therefore, the sealing ability is not deteriorated because the protruded bead structure becomes an obstacle, so that the effect of improving the sealing ability can be kept even when the cylinder head gasket 1 is excessively tightened.

If the density of compound material of the annular bead structure 6 is larger than that of other compound layer 2, the following advantages can be obtained. The displacement of the annular bead structure 6 becomes gentle when load is applied to the cylinder head gasket 1 which is intervened between the cylinder block and the cylinder head, and further the resilience in case of releasing the load is secured. Such a part of which density is different can be realized when the density of bead structure 6 is made larger than that of the other part in case of producing a gasket.

Figure 20:
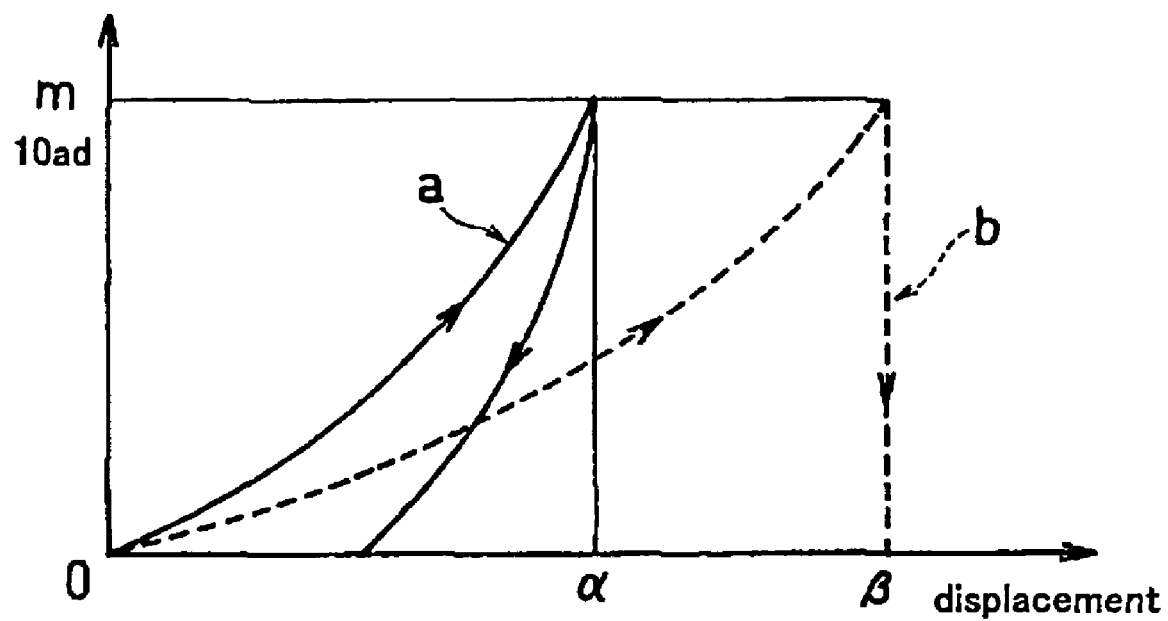
FIG. 20 is a graph showing the relation between the load and the displacement magnitude of each part when a cylinder head gasket is tightened.

Next its advantage is explained referring to FIG. 20.

FIG. 20 shows a graph showing the relation of the load and the displacement at each part when the cylinder head gasket 1 is tightened. The line "a" with a solid line shows how the annular bead structure 6 is changed when the material density is high and the line "b" with a broken line shows how the annular bead structure 6 is changed when the material density is low.

According to the line "a" at high density, as the load caused when the cylinder block and the cylinder head are integrated is increased, the displacement magnitude (the amount when the height becomes small) of the annular bead structure 6 is gradually increased, and the displacement magnitude becomes "α" at the largest load "m" by a standard tightening torque. If the load by tightening is released, the resilience characteristic of displacement at a certain degree accompanying hysteresis is achieved.

In contrast, according to the line "b" at low density, the increase of displacement accompanied with an increasing load is remarkable and the displacement magnitude at the highest load "m" becomes "β" which is apparently larger than that of line "a". Even when the load is released, the deformation is eternal because of the low density and the bead structure 6 is not restored. That is, an annular bead structure 6 with high density can be repeatedly used while keeping the bead function at a certain level.

Preferred Embodiment 8

Figure 21:
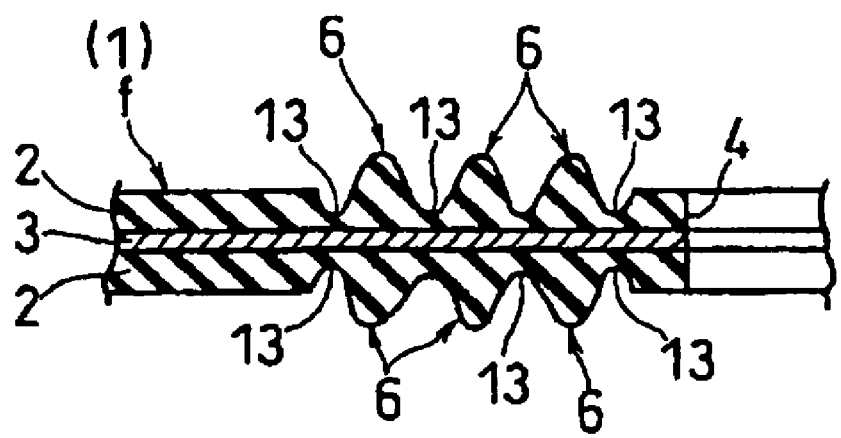
FIG. 21 is a partial section of a cylinder head gasket of which plural annular beads are formed in concentric manner.

The cylinder head gasket 1 may be constructed such that plural annular bead structures 6 are formed corresponding to the region around the cylinder bore in a concentric manner as shown in FIG. 21. In this embodiment, a three-race annular bead structures 6 is formed at the upper and lower surfaces of the compound layer 2 and an annular groove 13 is formed at four points on the compound layer 2 per one side.

If the plural annular bead structures 6 are thus formed on the compound layer 2 in a concentric manner, when the cylinder head gasket 1 is tightened between the cylinder block and the cylinder head, an effect that the setting pressure around the cylinder bore is increased and its sealing ability is achieved in a preferable condition without orientation relative to the cylinder bore as a whole. It is preferable that the outside annular bead structure 6 (centrifugal direction) around the cylinder bore, namely the large aperture 4, is made higher.

Preferred Embodiment 9

Figure 22A:
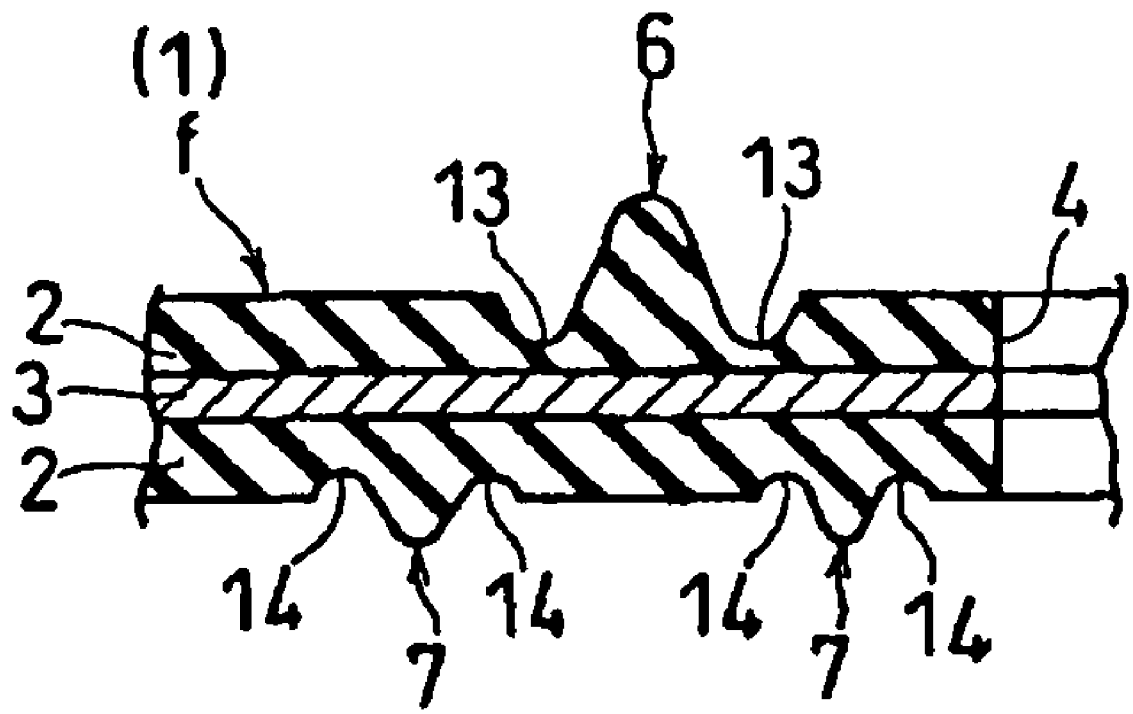
FIG. 22a is a sectional view of other bead structure according to the third aspect of the present invention and FIG. 22b is a side view emphasizing the deformation of a core material plate.

The cylinder head gasket 1 may be constructed such that a large annular bead structure 6 and a two-race annular groove 13 are formed on the upper compound layer 2 and a small annular bead structure 7 at the corresponding region around the inside and outside of the bead structure 6 of the upper compound layer 2 and small skirts 14 and 14 at both sides of the bead structure 7 are formed at the lower side of the compound layer 2 as shown FIG. 22a.

Figure 22B:
Figure 23:
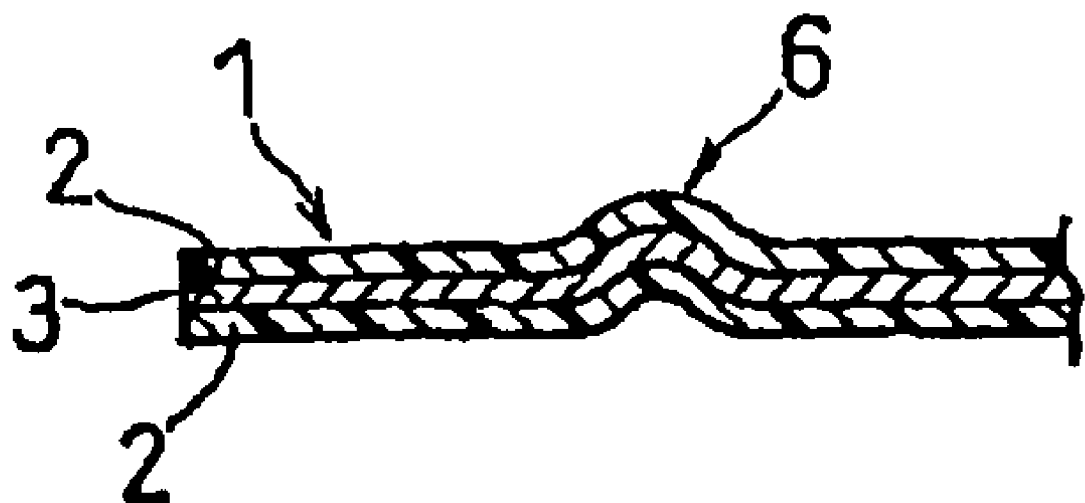
FIG. 23 is a partial sectional view showing one example of a prior cylinder head gasket with a compound layer.

According to such a construction, when the load is applied when the cylinder head gasket 1 is tightened, the bead structure 6 on the upper compound layer 2 is pushed downwardly serving two annular beads 7 and 7 at the lower compound layer 2 as a point of support, thereby acting the flexure moment deforming the shape shown in FIG. 22b on the core material plate 3. Then, the spring action is generated such that the core material plate 3 is to be returned into its original flat condition, so that the setting pressure around the large aperture 4 becomes high, thereby enlarging the sealing effect.

The cylinder head gasket 1 may be constructed with a composite base plate in which the compound layer 2 is coated on one side of the core material plate 3 and the annular bead structure 6 is formed only on this side of the core material plate 3. Further, the annular bead structure 6 and the annular groove 13 may have the section like a mountain based on trapezium or triangle other than like a mountain with a gentle curve.

The invention claimed is:

1. A cylinder head gasket for providing a seal between a cylinder block and a cylinder head, the cylinder block defining a cylinder bore, the cylinder head gasket composed of a composite base plate, comprising a core material plate and a compound layer formed on the front and back surfaces of said core material plate, said compound layer being formed by coating compound materials containing a rubber and fiber material, said cylinder head gasket so composed, comprising:

an annular groove which is formed in the compound layer associated with said cylinder bore, said annular groove being formed by pressing a corresponding region of said compound layer around said associated the cylinder bore, and defining thereby a bottom surface and an outer top surface;

an annular step groove, associated with said annular groove, that forms a shoulder in said compound layer, said annular step groove on each side defining a top vertical wall which extends from the outer top surface, a horizontal wall and a bottom vertical wall which extends to said bottom surface;

said bottom surface and said bottom vertical walls forming a chamber; and a seal member formed by inserting rubber material into said chamber, said seal member having a bead portion projecting above the top outer surface of said compound layer and a base portion which defines a top surface substantially coplanar with said horizontal wall.

2. The cylinder head gasket as set forth in claim 1, wherein said annular groove is formed on said compound layer by compressing the corresponding region of said compound layer with a projection of a molding die before said bead portion is formed by inserting the rubber material into said chamber in an injection molding process.

* * * * *